United States Patent [19]

Sasaki et al.

[11] Patent Number: 4,680,718
[45] Date of Patent: Jul. 14, 1987

[54] METHOD AND APPARATUS OF DETERMINING AN ATTITUDE OF A SATELLITE

[75] Inventors: Toshiro Sasaki, Yokohama, Japan; Michitaka Kosaka, Austin, Tex.; Satoshi Mohri, Tokyo, Japan; Katsumi Kawano, Fuchu, Japan; Shoji Miyamoto, Kawasaki, Japan

[73] Assignee: Hitachi, Ltd., Tokyo, Japan

[21] Appl. No.: 669,428

[22] Filed: Nov. 8, 1984

[30] Foreign Application Priority Data

Nov. 11, 1983 [JP] Japan ................................ 58-212202

[51] Int. Cl.4 .............................................. G06F 7/56
[52] U.S. Cl. ..................................... 364/455; 364/434; 244/171
[58] Field of Search .................. 364/455, 434, 459; 356/14, 144, 146, 152; 244/164, 171, 176; 318/582; 343/352, 355, 356, 357, 358

[56] References Cited

U.S. PATENT DOCUMENTS

| | | | |
|---|---|---|---|
| 3,251,261 | 5/1966 | Lillestrand | 356/141 |
| 3,263,088 | 7/1966 | Goldfisher | 356/141 |
| 3,488,504 | 1/1970 | Lowen et al. | 356/141 |
| 3,912,398 | 10/1975 | Zenk | 356/152 |
| 3,992,106 | 11/1976 | Auenbach | 356/141 |
| 4,388,646 | 6/1983 | Strother | 364/517 |

Primary Examiner—Errol A. Krass
Assistant Examiner—Thomas G. Black
Attorney, Agent, or Firm—Antonelli, Terry & Wands

[57] ABSTRACT

There is an attitude control method and system for a satellite. This system comprises a star catalogue of the universe, a star sensor and means for calculating features on the surface of the star sensor from a signal detected by the star sensor. The calculated features are compared with a table of which the star catalogue was reconstituted so as to easily search the features, thereby determining the attitude of the satellite.

6 Claims, 5 Drawing Figures

FIG. 4

| 1 | $h_1^*$, $x_1^*$, $y_1^*$ |
|---|---|
| 2 | $h_2^*$, $x_2^*$, $y_2^*$ |
| 3 | $h_3^*$, $x_3^*$, $y_3^*$ |
|   | : : : |
|   | : : : |
|   | : : : |

FIG. 5

| | | | | | | |
|---|---|---|---|---|---|---|
| 1 | $A_{11}$ $B_{11}$ | $A_{12}$ $B_{12}$ | $A_{13}$ $B_{13}$ | $A_{14}$ $B_{14}$ | $A_{15}$ $B_{15}$ | $\lambda_1, \phi_1$ |
| 2 | $A_{21}$ $B_{21}$ | $A_{22}$ $B_{22}$ | $A_{23}$ $B_{23}$ | $A_{24}$ $B_{24}$ | $A_{25}$ $B_{25}$ | $\lambda_2, \phi_2$ |
| 3 | ... | ... | ... | ... | | |
| 4 | ... | ... | ... | ... | | |
| 5 | ... | ... | | | | | ps
METHOD AND APPARATUS OF DETERMINING AN ATTITUDE OF A SATELLITE

BACKGROUND OF THE INVENTION

1. Field of the Invention

The present invention relates to a method and apparatus of determining the attitude of an artificial satellite and, more particularly, to a method and apparatus for determining the attitude of artificial satellite or the like using a star sensor.

2. Description of the Prior Art

A conventional attitude determining system using a star sensor in an artificial satellite (hereinafter, simply referred to as a satellite) uses a rough measurement value which is obtained by other attitude measuring sensors such as a gyroscope or the like and identifies the stars which are projected onto the star sensor from among the stars in the universe, thereby determining a precise attitude angle of the satellite from this information.

However, in the case where the attitude of a satellite largely deviates, or where other apparatuses such as the above-mentioned gyroscope and the like which are used for identification of the star fail, this method has a serious problem in that it is difficult to determine which stars are projected onto the star sensor, so that the determination of the attitude by the star sensor cannot be performed.

SUMMARY OF THE INVENTION

The present invention is made in consideration of the above-mentioned circumstances, and is intended to eliminate such problems in a conventional method of determining the attitude of a satellite and to provide a method of determining the attitude using a star sensor which can determine the attitude angle of a satellite even in the case where the attitude largely deviates or where other apparatuses for determination of the attitude fail.

The above object of the invention is accomplished in a manner such that, in an attitude control system using a star sensor, features of images on the star sensor surface are calculated at a high speed by a processor, and the results of these calculations are compared with a table of which a star catalogue of the universe was reconstituted so as to easily search the above-mentioned features, thereby determining the attitude.

BRIEF DESCRIPTION OF THE DRAWINGS

FIG. 4 is a diagram showing the data regarding the luminous intensities and locations of stars on the sensor surface; and FIG. 5 is a diagram showing the data of the star catalogue reconstituted.

DESCRIPTION OF THE PREFERRED EMBODIMENTS

An embodiment of the present invention will now be described in detail hereinbelow with reference to the drawings.

Figure 1:
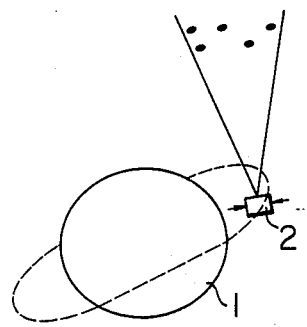
FIG. 1 is a diagram showing a situation whereby a satellite equipped with a star sensor is circulating around the earth.
Figure 2:
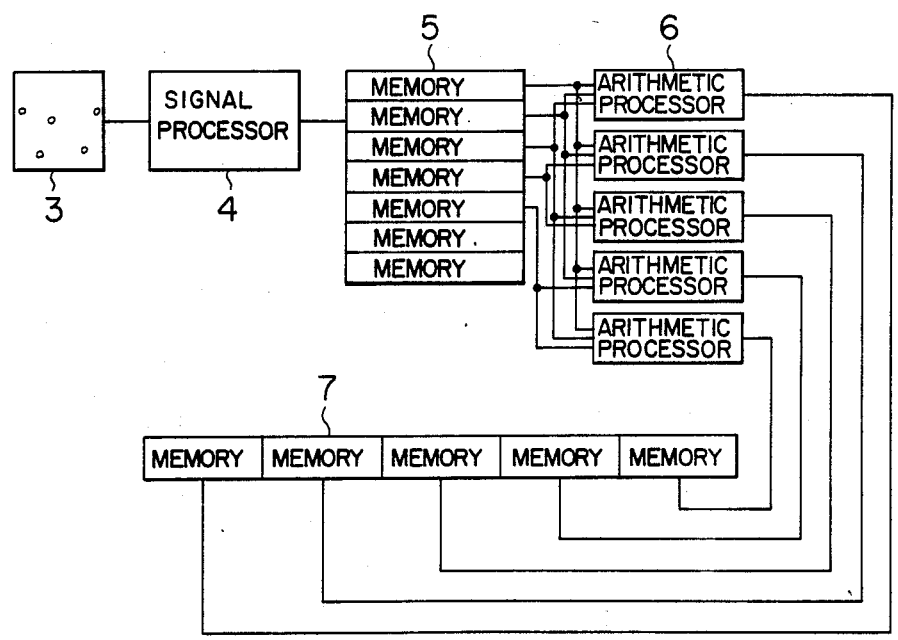
FIG. 2 is a diagram showing an arrangement of a system for processing observation data.

FIG. 1 is a diagram showing a situation whereby a satellite 2 circulating around the earth 1 is using a star sensor. FIG. 2 is a block diagram showing an arrangement of an observation data processing section in a star identification system installed in the satellite 2 as one embodiment of the invention. In FIG. 2, a reference numeral 3 denotes a star sensor; 4 a signal processor for processing an input signal received from the star sensor 3; 5 memories to store the result of processing by the signal processor 4; 6 an arithmetic processor for operating on features described later from the result of processing by the signal processor 4; and 7 memories to store the results of processings by the arithmetic processor 6. The arithmetic processor 6 is constituted by a plurality of processing units arranged in parallel.

The signal processor 4 processes the input signal receive from the star sensor 3 and converts images of stars which are projected at present onto the surface of the star sensor 3 to groups of data each consisting of luminous intensity, x coordinate on the sensor surface, and y coordinate on the sensor surface, and then the processor 4 stores the data into the memories 5 in accordance with the sequence of luminous intensities.

The arithmetic processor 6 makes the combinations of the contents of each group in the memories 5 and calculates the features on the sensor surface with respect to these combinations. The calculation steps for these characteristic amounts are processed in parallel by changing the combinations of the memories 5 as shown in FIG. 2. The results of the above calculations are stored in the memories 7 in accordance with the sequence of combinations of bright stars on the sensor surface.

Figure 3:
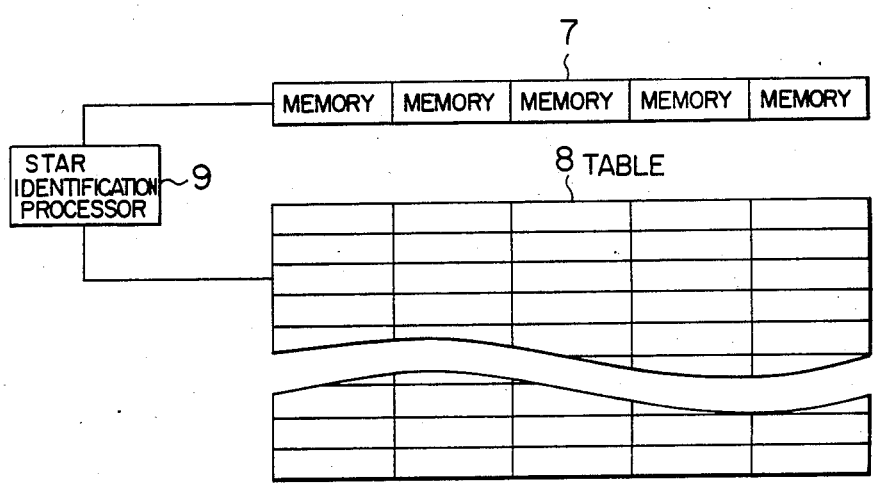
FIG. 3 is a diagram showing an arrangement of a processing system for identification of stars.

FIG. 3 shows an apparatus for reading out the information stored in the memories 7 and identifying to which section in the universe the readout information belongs. In the diagram, a numeral 8 denotes a table of which the features from a star catalogue (planisphere) of the universe were reconstituted and arranged so as to easily search them as mentioned later; and 9 is a processor for identifying the stars by comparing the contents of the memories 7 with the contents of the table 8.

Next, a method of selecting the features which are used in this star identifying method and a method of arranging the contents of the table 8 will be explained. As the features which should be selected for identification of stars, the following amounts and the like are considered.

(1) Angular difference between two stars on the sensor surface.
(2) Angular area of the triangle which is formed by three stars on the sensor surface.
(3) Brightness of a star.

In this case, the star identification method will be explained whereby the angular area of the triangle (hereinafter, simply referred to as the area) and the sum of luminous intensities of those three stars are selected as the features by combining the above-mentioned characteristic amounts (2) and (3). However, the stars can be also similarly identified even in combination of (1) and (3).

The method of arrangement of the contents of the table 8 is such that with respect to a star of the sixth or better magnitude in the universe, the sum of the brightness of such a star and the adjacent two stars and the area of the triangle formed by these three stars are preliminarily calculated on the basis of a few kinds of combinations by changing the selection of the two stars, and the data regarding such sum and area are rearranged so that they can be easily searched. In FIG. 5, the contents of the table 8 are shown using the number i of the reference star and the combination number j of the stars which form the triangle, in which an area $A_{ij}$ and a sum $B_{ij}$ of the luminous intensities of those three stars, and a right ascension $\lambda_i$ and a declination $\phi_i$ of the reference star are arranged. In this case, a method of arrangement of columns in one row, that is a method of writing the number j is such that the numbers are sequentially written from the larger area $A_{ij}$ of the triangle. The respective rows are arranged in such a manner that the luminous intensities of the stars are largely classified into several ranks and further among them, the data is sequentially arranged from the larger area value $A_{ij}$ in the first column. With such an arrangement, the stars which are sensed by the sensor can be searched from the image data on the sensor surface at high speed. Furthermore, by making several combinations of ambient stars with respect to one star, it is possible to cope with the image data which includes the noise.

The process content of each processor will then be explained in detail.

In the processor 4, the following steps are executed.

Step 1: Arrange the stars which were observed in accordance with the sequence of brightness.

Step 2: Store the luminous intensity $h_i$, x coordinate $x_i$ on the sensor surface and y coordinate $y_i$ on the sensor surface of that star into the memories 5 in accordance with the sequence of the brighter stars, wherein i indicates the sequence number of the bright star. The contents of the memories 5 are as shown in FIG. 4.

On the other hand, in the arithmetic processor 6, the following steps are performed.

Step 1: Calculate a sum $B_1^*$ of brightnesses of the three stars and an area $A_1^*$ of the triangle from the first, second and third data in the memories 5. At the same time, in the other parallel processing units, the above $B_i^*$ and $A_i^*$ are calculated with respect to the combinations of the other data in the memories 5.

Step 2: Store the respective values of $A_i^*$ and $B_i^*$ into the memories 7.

In the processor 9, the following steps are carried out.

Step 1: Select some of the numbers of the stars which should be searched in the table 8 on the basis of the values of $B_1$ and $A_1$ in the memories 7.

Step 2: Calculate the following penalty $P_i$ with respect to each of the i-th star to be compared.

$$P_i = \Sigma_j \{\alpha |A_{ij} - A_j^*| + \beta |B_{ij} - B_j^*|\}$$

where, $\alpha$ and $\beta$ represent weights.

Step 3: Determine the star of which the above penalty $P_i$ is smaller than a certain permissible value $\epsilon$ as the star which should be searched. Regard the right ascension and declination of the i-th star which was determined as the right ascension and declination of the brightest star projected onto the star sensor surface. Then, finish the identification of the star.

In the foregoing embodiment, an example whereby the area of the triangle including the reference star is used as the feature has been shown. However, in place of this amount, the angular difference between two stars may be used as mentioned before. On one hand, the processing in the arithmetic processor 6 is not necessarily limited to parallel processing, but other processing methods such as a serial-parallel processing or the like may be used.

As described above, according to the present invention, in the attitude control system using a star sensor, the features of the images on the star sensor surface are calculated by the processor at a high speed; the results of these calculations are compared with the table of which the star catalogue of the universe was reconstituted so as to easily search the features, thereby determining the attitude. Therefore, the above-mentioned problems in the conventional method of determining an attitude of a satellite are eliminated. Also, there is a remarkable effect such that it is possible to realize an attitude determining method which can determine an attitude angle of a satellite from the projection diagram on the star sensor itself even in the case where the attitude largely deviates or where other attitude determining apparatuses fail.

What is claimed is:

1. A method of determining the attitude of an object in an attitude control system using a star sensor, comprising the steps of:
    (a) calculating predetermined features of images detected by said star sensor by means of a processor;
    (b) storing predetermined features in a star catalogue of the universe in the form of a table of feature data including numeric data calculated from the position and brightness of selected stars with respect to at least one adjacent star so as to make it easy to search said features in said star cataglogue; and
    (c) comparing said calculated features with the features stored in said table, thereby determining the attitude of the object.

2. An attitude determinating apparatus for determining the attitude of a star sensor, comprising:
    (a) processor means for calculating predetermined features of images detected by said star sensor;
    (b) means for storing the calculated features;
    (c) means for storing predetermined features in a star catalogue of the universe in the form of a table of feature data including numeric data calculated from the position and brightness of selected stars with respect to at least one adjacent star so as to easily search said features in said star catalogue; and
    (d) means for comparing said calculated features with the features stored in said table, thereby determining the attitude of said star sensor.

3. A method of determining attitude in an attitude control system using a star sensor, comprising the steps of:
    (a) preparing a reference table of position data for a plurality of reference stars having a brightness greater than a predetermined value in the universe and feature data representing features as to the distribution of stars located adjacent to said reference stars, said feature data including numeric data calculated on the basis of data as to the position and brightness of said reference stars and at least one of said adjacent stars located adjacent to said reference stars, a plurality of said feature data being provided for various combinations of each of said reference stars with respect to said adjacent stars;

(b) obtaining observation data as to the brightness and sensor-position of stars projected onto said star sensor;

(c) calculating a plurality of second feature data as to the distribution of said projected stars onto said star sensor based on said observation data by selecting various combinations of the brightest stars among the observed stars projected onto said star sensor with at least one other observed star;

(d) comparing said plurality of second feature data obtained from said observation data with said feature data from said reference table to find a reference star corresponding to said brightest star, thereby to determine the attitude of said star sensor using said position data for said reference stars in the universe.

4. A method of determining attitude in an attitude control system according to claim 3, wherein said feature data provided in said reference table and said second feature data calculated from said observation data each include numeric data proportional to the sum of the brightness of a set of stars.

5. A method of determining attitude in an attitude control system according to claim 3, wherein said feature data provided in said reference table in said second feature data calculated from said observation data each include numeric data proportional to an area determined by connecting a set of stars.

6. A system for determining an attitude using a star sensor, comprising:

(a) first means for storing position data for a plurality of reference stars having a brightness over a predetermined value in the universe and feature data representing features as to the distribution of stars adjacent to said reference stars, said feature data including numerica data calculated on the basis of data as to the position and brightness of said reference stars and at least one of said adjacent stars located adjacent to said reference stars, a plurality of said feature data being provided for various combinations of each of said reference stars with respect to said adjacent stars;

(b) second means for producing data as to the brightness and sensor-position of stars projected onto said star sensor;

(c) third means for calculating a plurality of second feature data as to the distribution of said projected stars onto said star sensor based on said observation data by selecting various combinations of the brightest stars among the observed stars projected onto said star sensor with at least one other observed star;

(d) fourth means for comparing said plurality of second feature data obtained from said observation data with said feature data from said reference tahle to find out a reference star corresponding to said brightest star, thereby to determine the attitude of said star sensor using said position data for said reference stars in the universe.

* * * * *